Sept. 20, 1932.  H. W. McINTOSH  1,878,591
ELECTRIC GLASS MELTING TANK
Filed July 25, 1929

Witness;
W. B. Thayer

Inventor;
Harold W. McIntosh
by Brown & Parham
Attorneys

Patented Sept. 20, 1932

1,878,591

UNITED STATES PATENT OFFICE

HAROLD W. McINTOSH, OF WEST HARTFORD, CONNECTICUT, ASSIGNOR TO HARTFORD-EMPIRE COMPANY, OF HARTFORD, CONNECTICUT, A CORPORATION OF DELAWARE

ELECTRIC GLASS MELTING TANK

Application filed July 25, 1929. Serial No. 380,950.

My invention relates to electric glass melting tanks, of the type wherein the glass acts as an electric conductor, and, more particularly, to the construction of the glass contact surface of the bottoms and side walls thereof.

Heretofore, in constructing tanks of this character, it has been customary in lining the surface of the bottom and sides with refractory blocks which contact with the glass, to lay them in an unstaggered relationship with each other. As a result of this method it is obvious that when the blocks have been completely laid, the joints or connections between the blocks extend approximately in continuous straight lines at right angles to each other throughout the entire surface of the tank. It is well known that in all glass melting tanks the molten glass erodes the joints between the blocks and, to a lesser extent, the blocks themselves.

In the course of my experiments with electric glass melting furnaces of the type in which the electric current is passed through the glass, I have discovered that whenever the current passes in the same general direction adjacent to a continuous joint or crack in the bottom or side walls that an excessive wear of the blocks occurs at an adjacent to such cracks or crevices. I have also found that as this wear progresses, the temperature of the glass adjacent to the joints or cracks increases and the wear is accordingly accelerated, while the temperature of the remaining portions of the glass falls. I have in these instances found it necessary to increase the voltage applied across the electrodes as the wear in these crevices increases, in order to maintain the bath of glass at a uniform desired temperature. I have found that the conditions above described do not exist in the absence of crevices and joints running substantially parallel to, and for a major portion of the path of the current and that the difficulties above described may be avoided by eliminating such joints or crevices.

It is therefore an object of the present invention to provide an electric glass melting tank in which the bottom and side walls adjacent to the path of the current through the glass are so built as to be free from these objectionable joints or crevices and in which therefore uniform heating conditions may be maintained by the application of uniform voltage.

Figure 1:
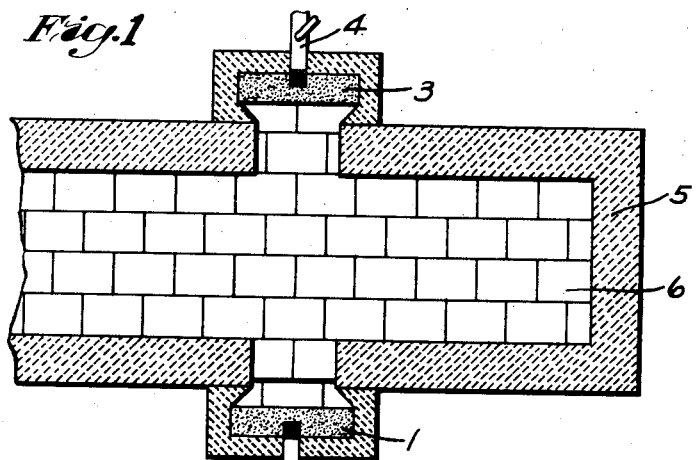
Figure 2:
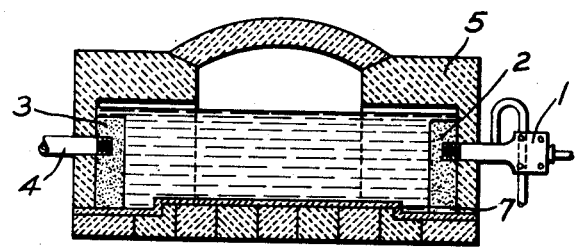
Figure 3:
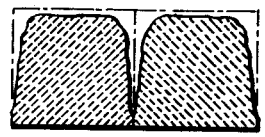
Figure 4:
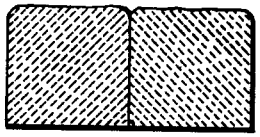

In the drawing, Figure 1 is a plan view in section of one end of an electric glass melting tank. Figure 2 is a vertical section of a glass melting tank. Figure 3 is a cross-section of two refractory blocks showing the erosion which takes place when the joint is parallel to the flow of electricity. Figure 4 is a cross-section of two refractory blocks with a joint at approximate right angles to the line of flow of electricity.

In Fig. 1, 1 and 3 represent a pair of cooperating electrodes supplied respectively with current through the leads 2 and 4. 5 diagrammatically represents the side walls of the tank, and 6 represents the bottom of the tank, showing the refractory blocks laid in a staggered relationship to one another. It is to be noted that the blocks in Figure 1 are staggered with relation to the line of flow of electricity between the electrodes 1 and 3, and that there is no continuous straight line extending across a major portion of the bottom of the tank, parallel to the flow of electricity.

Figures 3 and 4 are shown to illustrate diagrammatically the difference between the erosion on a block when the joint extends parallel to the flow of electricity and across a major portion of the bottom of the tank (Figure 3) and the erosion which takes place when the joint is at right angles to the flow of electricity (Figure 4).

In Figure 2 another form of my invention is shown at 7 where the bottom of the tank is provided with a monolithic lining which may be formed in any well known way. It is necessary only that there be no break in the structure parallel with the flow of electricity and in proximity thereto.

Still another form of my invention consists in using refractory blocks of a greater length than those customarily used. These blocks must be of such length that when laid they will extend completely across the path of flow of electricity between the electrodes, thus leaving no joints in proximity to the line of flow of electricity and parallel thereto. In connection with this form of my invention, as with the form of Fig. 1, it is to be noted that the width of the blocks is immaterial. It is immaterial whether the various forms of my invention are applied to the entire contact surface of the tank or only in proximity to the path of the electric current.

While I have referred, above, more particularly to the bottom as being the portion of the tank in which the uneven wear takes place I have done this not as a limitation but as an illustration. A similar uneven erosion takes place in either the side walls or the end walls if the joints are substantially parallel to the path of the current and adjacent thereto. The forms of my invention described above are equally applicable to the side or end walls should the electrodes be so placed that the path of the current runs in the vicinity thereof.

By the application of the above described methods unequal wear of the glass contact surface is avoided. A result of the avoiding of this unequal wear is that the temperature of the molten glass is not substantially higher at the cracks or joints in the contact surface than it is elsewhere and consequently the application of uniform voltage will produce a heat which, as far as the container is concerned, is uniform.

My invention is applicable to forehearths and similar glass conditioning structures as well as to tanks in which batch is reduced to glass, and while it is true that normally glass is not "melted" but rather is conditioned by maintaining it at the proper temperature in a forehearth, I wish it to be understood that the expression "glass melting tank," as used in this description and in the appended claims, is to be considered sufficiently broad to include not only structures in which the glass batch is converted into glass and thereafter refined, but also conditioning chambers such as forehearths.

It will be understood that my invention is not limited to the details of construction which are shown herein for illustrative purposes only, and that my invention includes all such structures as fall within the scope of the appended claims.

I claim as my invention:

1. In the glass melting art, an electric melting tank of the type wherein the glass acts as an electric conductor, having a surface free from joints extending in an unbroken line, parallel with the flow of electricity.

2. In the glass melting art, a tank, having a monolithic glass contact bottom surface, electrodes in the glass, and means for supplying current to the electrodes and the glass.

3. In the glass melting art, an electric melting tank of the type wherein the glass acts as an electric conductor, having the glass contact surface composed of refractory blocks placed in a staggered relationship to one another and to the path of the current.

4. In the glass melting art, an electric melting tank of the type wherein the glass acts as an electric conductor, having a glass contact surface in proximity to the path of the current free from joints extending in an unbroken line, parallel with the flow of electricity, across a major portion of the tank.

5. In the glass melting art, a tank adapted for electric melting and having a monolithic glass contact surface in proximity to the path of the current, electrodes in the glass and means for supplying electricity to the electrodes and the glass.

6. In the glass melting art, an electric melting tank of the type wherein the glass acts as an electric conductor, having the glass contact surface in proximity to the path of the current composed of refractory blocks placed in a staggered relationship to one another and to the path of the current.

7. A tank for melting glass by the use of electricity comprising a bottom of refractory bricks, a monolithic covering of refractory material over said bricks, electrodes in said tank positioned above said monolithic covering and in contact with the glass, and means for passing a current of electricity between the electrodes and through the glass.

Signed at Hartford, Connecticut, this 23rd day of July, 1929.

HAROLD W. McINTOSH.